Aug. 20, 1968     A. G. BROSIUS, SR     3,397,911
AUTOMOTIVE SAFETY DEVICE
Filed Jan. 20, 1964                           2 Sheets-Sheet 1
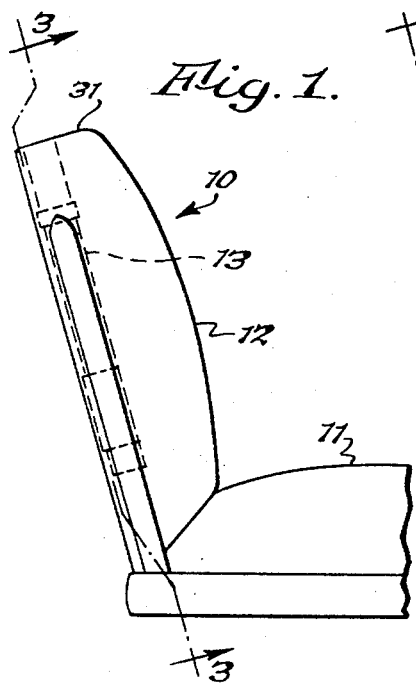
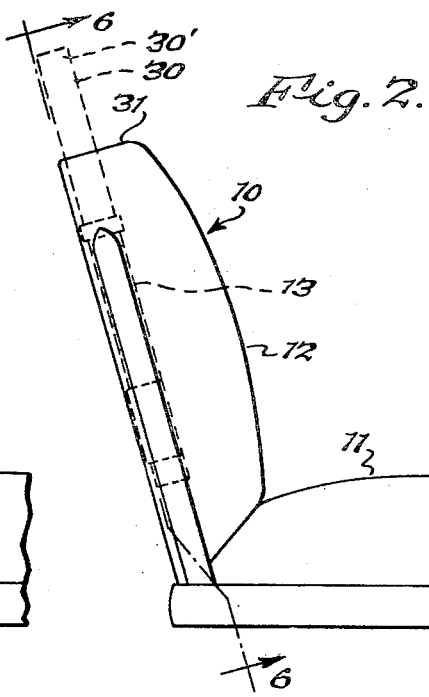
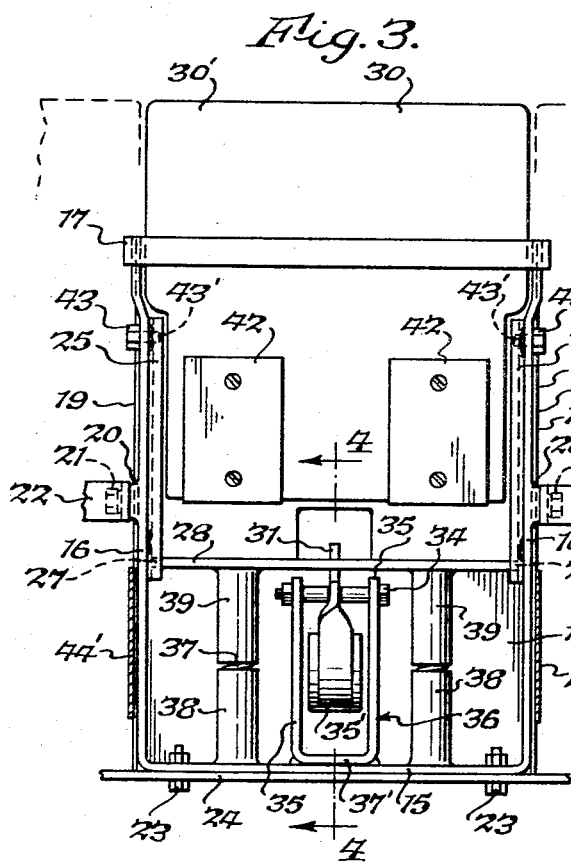
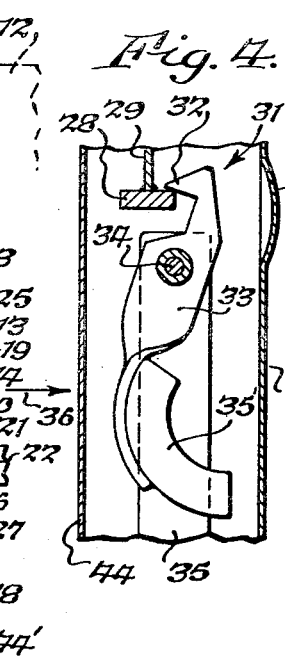
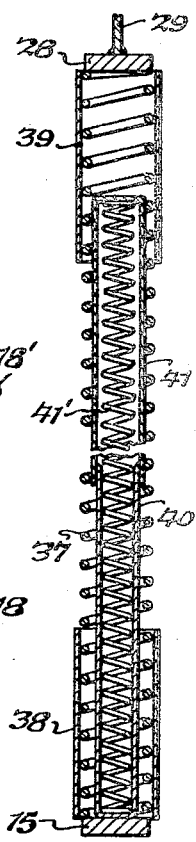
INVENTOR.
Arthur G. Brosius, Sr.
BY
Joseph P. Gastel
ATTORNEY.

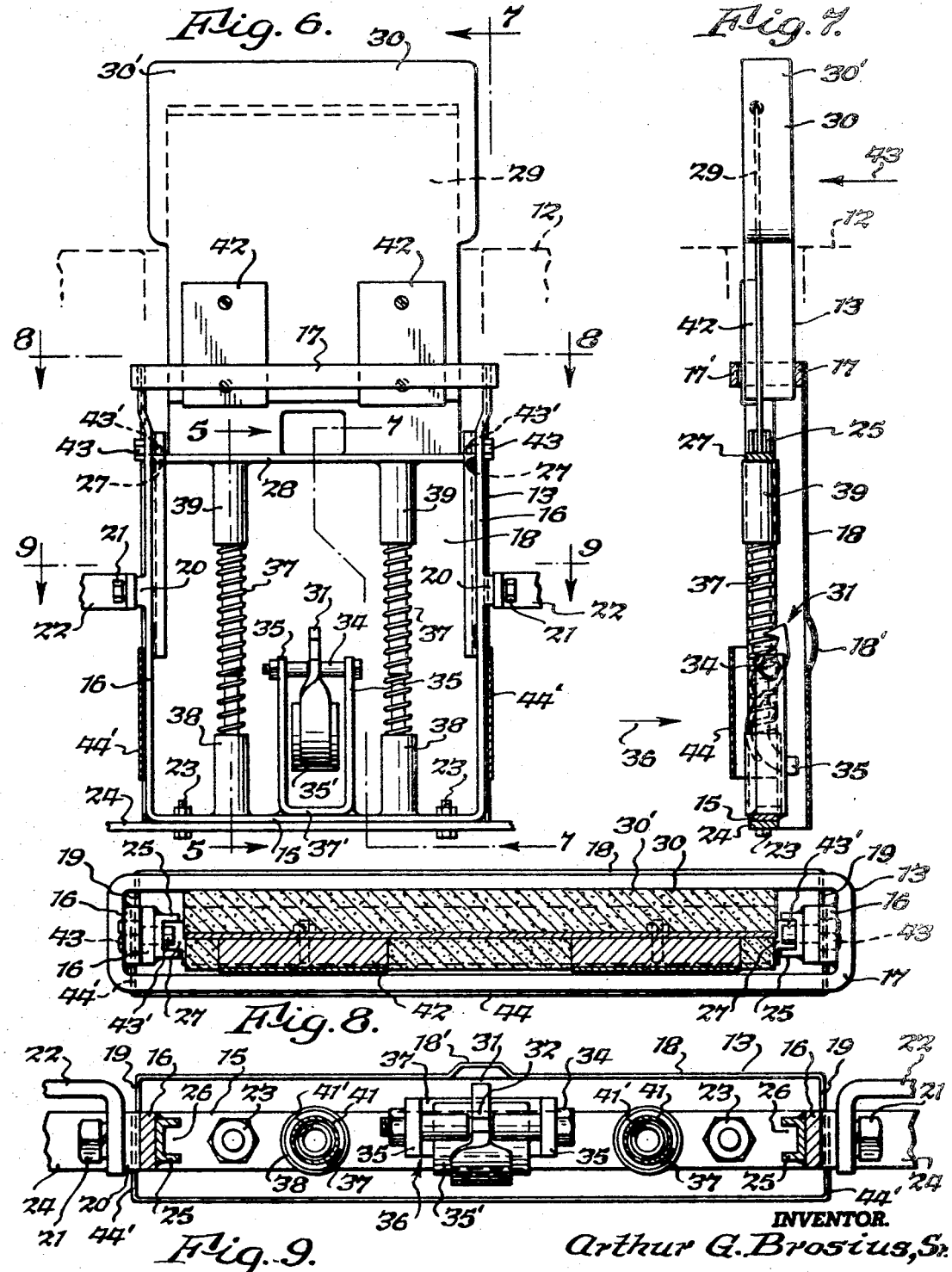

United States Patent Office 3,397,911
Patented Aug. 20, 1968

3,397,911
AUTOMOTIVE SAFETY DEVICE
Arthur G. Brosius, Sr., 145 St. James Place,
Buffalo, N.Y. 14222
Filed Jan. 20, 1964, Ser. No. 338,827
6 Claims. (Cl. 297—216)

The present invention relates to an automotive safety device and more particularly to a device for preventing a whiplash type of neck injury to an occupant of a vehicle involved in a rear end collision.

The object of the present invention is to provide an improved antiwhiplash type of attachment for an automotive vehicle which can be installed in the back rest portion of a vehicle seat in a relatively simple manner and which in no way interferes with normal vehicle operation because it is normally retracted to an out-of-the-way position except when a rear end collision causes it to project upwardly to provide a shock absorbing abutment for a person's head. Other objects and attendant advantages of the present invention will readily be perceived hereafter.

The improved antiwhiplash device of the present invention includes a frame which is adapted to be mounted within the back rest portion of a vehicle seat. Mounted within the frame is a head supporting section which is retained in a retracted position within the vehicle seat by a latch mechanism. The latch mechanism has a pendulum type of device associated therewith and the latch mechanism normally maintains the head supporting section in position against the bias of a spring arrangement tending to urge the head supporting section upwardly. The pendulum mechanism causes the latch to release only in the event that the vehicle is struck from behind whereupon the spring means will cause the head supporting section to project upwardly from the rear of the vehicle seat and a cushioned surface on said plate will provide a shock absorbing abutment to stop a person's head from snapping backwardly to an extent where the person would suffer a whiplash type of injury. The present invention will be more fully understood when the following portions of the specification are read in conjunction with the accompanying drawings wherein:

FIG. 1 is a fragmentary elevational view of a vehicle seat mounting the improved antiwhiplash device in a retracted position;

FIG. 2 is a fragmentary elevational view of a vehicle seat showing the improved antiwhiplash device in a projected position to act as an abutment for the rear of a person's head;

FIG. 3 is a view taken substantially along line 3—3 of FIG. 2 and showing the improved antiwhiplash device in its retracted position;

FIG. 4 is a fragmentary elevational view taken substantially on line 4—4 of FIG. 3 and showing a detail of the latch mechanism;

FIG. 5 is a detail view taken generally along line 5—5 of FIG. 6 and showing the specific construction of the springs which are used to cause the antiwhiplash device to move into a projected position to act as an abutment for the rear of a person's head;

FIG. 6 is a view taken generally along line 6—6 of FIG. 2 and showing the antiwhiplash device in a projected position;

FIG. 7 is a view taken generally along line 7—7 of FIG. 6;

FIG. 8 is a view taken along line 8—8 of FIG. 6; and

FIG. 9 is a view taken along line 9—9 of FIG. 6.

In FIGS. 1 and 2 an automotive vehicle seat 10 is shown having a seat portion 11 and a back rest 12. The seat is mounted on an automotive vehicle in the usual manner. Mounted within the back rest 12 of seat 10 is the present antiwhiplash device 13. It is to be noted at this point that device 13 is normally in a retracted position where it does not extend beyond the seat so that it does not interfere with normal vehicle operation. However, as will become more apparent hereafter, when the vehicle is struck from behind, the antiwhiplash device 13 will come into play to provide a shock-absorbing abutment for the rear of a person's head and thereby prevent him from suffering a whiplash injury.

The improved antiwhiplash device 13 of the present invention includes a metal frame 14 having a horizontal lower member 15, side members 16 extending upwardly therefrom and formed integrally therewith, the latter being secured at their upper ends to rectangular loop 17 (FIG. 8). A plate or sheet-like member 18 extends from upper rectangular frame member 17 all the way down to member 15 and is suitably secured to said members by screws or the like, not shown, which extend through flanges 19 formed at opposite edge portions of plate 18 and vertical frame members 16. Also secured to side portions 16, as by welding, are screw receiving sockets 20 which are suitably tapped to receive screws 21 for fastening said side members 16 to suitable frame members 22 located within the vehicle seat 10. To complete the attachment between frame 13 and the vehicle seat, nuts and bolts 23 are provided which extend through horizontal lower frame member 15 and a frame member 24 forming a part of the vehicle seat.

U-shaped guides 25 (FIG. 9) are welded to the inside facing surfaces of side members 16 with the open sides 26 of guides 25 facing each other. Lugs 27 (FIG. 8), which are formed at opposite ends of cross bar 28 are adapted to ride in U-shaped guides 25, as will become more apparent hereafter. Ordinarily when the antiwhiplash device 13 is in its retracted position within seat 10, cross bar 28 occupies the position shown in FIG. 3 and metallic plate 29 (FIG. 7) which is attached thereto is so located that the covering 30 of the latter does not protrude above the top 31 of the back rest 12 of seat 10 (see FIG. 3). Covering 30 may be foam rubber but is preferably shock-absorbing foam plastic material. It is pendulum latch 31 which retains the head supporting section 30' consisting of foam material 30 and plate 29 in its retracted position within seat 12 because the latch portion 32 (FIG. 4) of said latch engages the central portion of cross bar 28 in the manner shown in FIG. 4. Latch 31, in addition to consisting of the latch portion 32, also includes a central body portion 33 which is pivotally mounted on pin 34 extending between upright legs 35 of U-shaped bracket 36, the lower portion of which is suitably secured, as by welding, to cross bar 15 of the frame. Mounted on latch 31 is a weight 35', in the manner shown in FIG. 4, so that latch 31 essentially acts as a pendulum in the event of a rear end collision.

In the event the vehicle is hit from behind so that the force of impact is in the direction of arrow 36 of FIG. 4, the following sequence of events will occur: Pendulum latch 31 will tend to swing in a clockwise direction about pin 34 in FIG. 4 and in so doing the latch portion 32 thereof will move out of engagement with cross bar 28. This will permit heretofore compressed springs 37 to expand to thereby move the head support section 30' from the position shown in FIG. 3 to the position shown in FIG. 6, to thereby provide a shock absorbing abutment for the rear of a person's head which is snapped backwardly in the event of a rear end type of collision. During the foregoing movement of head supporting section 30', rectangular frame 17 acts as a guide to cause section 30' to move upwardly in a vertical manner. It is to be noted from FIG. 3 that the lower portion of each of springs 37 is normally housed within hollow tubular members 38 which are affixed to bottom cross frame member 15 and the upper portion of each of springs 37 is housed within inverted hollow cylindrical member 39 depending downwardly from cross frame member 28. In order to guide springs 37 so that they do not buckle sideways during the expansion thereof, telescoping members 40 and 41 (FIG. 5) are provided, upper telescoping member 41 fitting within upper cylindrical member 39 and lower telescoping member 40 fitting within cylindrical member 38. Springs 41' are located within telescoping members 40 and 41 to cause them to assume the extended position shown in FIGURE 5 when latch 31 is released. It can be seen that when tubular members are in the position shown in FIG. 3, springs 37 are totally protected from contact with other objects within the seat.

As can be seen from FIGS. 3 and 6, plates 42 are secured to the lower portion of head supporting plate 29 by nuts and bolts, not numbered. It will be appreciated that when a person's head moves rearwardly in the direction of arrow 43 of FIG. 7 and strikes padding 30, plate 29 will tend to pivot in a counterclockwise direction in FIG. 7 about lugs 27 which moved up into engagement with the end 43 of screws 43', the latter acting as positive stops to limit upward movement of head supporting section 30'. However the existence of plates 42 will prevent any appreciable counterclockwise pivotal movement of head supporting section 30' because they take up the play between plate 29 and portion 17' of rectangular frame member 17.

It is to be noted that plate 18 (FIG. 4) has a drawn portion 18' to permit unimpeded swinging movement of pendulum latch 31. Furthermore it is to be noted that a plate 44 (FIG. 7) is mounted across frame members 16 in the vicinity of pendulum latch 31 to prevent internal portions of seat 10, such as the springs or padding thereof, from in any way interfering with unimpeded swinging movement of pendulum latch 31, as is required during the release of head supporting section 30'. This mounting is effected by securing flanges 44' of plate 44 to vertical frame members 16.

It can thus be seen that the improved antiwhiplash device of the present invention is manifestly capable of achieving the above enumerated objects of remaining retracted when it is not in use and thus in no way interfering with normal vehicle operation. Furthermore, it will project outwardly from the seat in which it is concealed only upon rear end impact with the vehicle to thereby provide a firm shock-absorbing support for the rear of a person's head to thereby prevent whiplash injury which would otherwise occur. In addition it is to be noted that after the head supporting section 30' has been projected outwardly, in the event of a rear end collision, it can be pushed downwardly back into a retracted position such as shown in FIG. 1 without any extensive effort because all that is necessary is to overcome the resistance of springs 37 by pressing downwardly on head supporting section 30' until such time as cross bar 28 rides over cam surface 48 (FIG. 4) to thereby cause pendulum latch 31 to swing in a clockwise direction until such time as cross bar 28 moves to the position shown in FIG. 4 whereupon pendulum latch 31 will pivot in a counterclockwise direction so that latching portion 32 thereof firmly engages the top of cross bar 28 and holds head supporting section 30' in a retracted position shown in FIG. 1.

If for any reason the instant device is utilized with seats which have an exceptionally short back rest, the head supporting section 30' may be permitted to protrude for a short distance beyond the top of the back rest.

In addition it will readily be appreciated that while the instant construction which has been depicted in the accompanying drawings has been shown as installed within the back rest of a vehicle seat, it can also be strapped to the rear of the back rest of the vehicle seat by the use of suitable straps or it may be bolted onto the rear of the vehicle seat in a suitable manner. The advantage of this type of arrangement is that the device need not be installed during the original manufacture of the vehicle but may be added as an accessory at a later time.

In addition, it is to be noted that the instant construction may be utilized as a concealed head rest. In this respect if it is desired to lift the head supporting section 30' to act as a head rest, it is merely necessary to provide an unlatching mechanism, not shown, accessible to the vehicle operator to thereby permit the unlatching of pendulum latch 31 as desired. With this type of arrangement, the device of the instant invention, in addition to functioning as an antiwhiplash mechanism, may also be utilized as a head rest. In order to retract the head supporting section 30', it is merely necessary to press it back into its frame in the manner described above, until it latches itself. The unlatching mechanism alluded to above may be a suitable Bowden wire cable or a lever attached to the seat frame.

In addition, if desired, an arrangement may be provided which is selectively used to hold the head supporting section 30' in any adjusted position between its lowermost and uppermost positions to thereby provide a head rest at any elevation above the top of the seat.

While a preferred embodiment of the present invention has been disclosed, it will readily be appreciated that the present invention is not limited thereto, but may be otherwise embodied within the scope of the following claims.

I claim:

1. An antiwhiplash device for mounting on the back rest portion of an automotive vehicle seat comprising a frame member, a head supporting section slidably mounted on said frame member, impact absorbing means forming a part of said head supporting section, spring means for urging said head supporting section to an extended position for providing a shock absorbing abutment for the rear of a person's head, latch means for retaining said head supporting section in a retracted position on said frame against the bias of said spring means, and impact responsive means operatively associated with said latch means for releasing said latch means only in the event of a rear end impact on said vehicle to thereby cause said spring means to move said head supporting section to said extended position.

2. An antiwhiplash device as set forth in claim 1 wherein said impact responsive means comprises a pendulum forming part of said latch means.

3. An antiwhiplash device comprising a frame having a pair of upwardly extending vertical side members, guide means on each of said upwardly extending vertical side members, a head supporting section movably mounted on said frame, said head supporting section including means adapted to ride in said guide means, said head supporting section being capable of occupying a retracted position within said frame means and an extended position relative to said frame means, spring means for urging said head supporting section to said extended position, latch means for retaining said head supporting section in said retracted position against the bias of said spring means, and impact responsive means operatively associated with said latch means for causing said latch means to release said head supporting section in the event said frame is subjected to a force which is normally experienced when a vehicle in which said frame is mounted is struck from the rear.

4. An antiwhiplash device comprising a frame, means on said frame for mounting said frame on the back rest of a vehicle, a pair of side members on said frame, first guide means on said side members, a head supporting section adapted to be located in a retracted position in said frame, second guide means on said head supporting section adapted to cooperate with said first guide means, said head supporting section comprising a plate-like member including a shock-absorbing covering thereon, spring means operatively interposed between said frame and said head supporting section for biasing said head supporting section toward an extended position, a pendulum latch mounted on said frame for retaining said head supporting section in a retracted position on said frame against the bias of said spring means, said head supporting section being movable to said extended position under the urging of said spring means when said pendulum latch releases said head supporting section in response to the subjecting of a vehicle in which said antiwhiplash device is located to a rear end impact.

5. An antiwhiplash device as set forth in claim 4 wherein said spring means comprise helical compression springs and wherein first tubular members are located on said frame and second tubular members are located on said head supporting section, said first and second tubular members substantially concealing said spring means when said head supporting section is in a retracted position.

6. In an automatic protective device for an occupant of a vehicle seat having a substantially vertical backrest, the combination including plate means, mounting means for normally positioning said plate means on said backrest to the rear and entirely below the head of a seat occupant, means for ejecting said plate upwardly adjacent the back of the head and neck of seat occupant to prevent a whiplash injury, the forward face of said plate being covered by a shock absorbing layer of material to reduce the force of impact between the head and the plate.

References Cited
UNITED STATES PATENTS

| | | | |
|---|---|---|---|
| 365,248 | 6/1887 | Fackrell | 297—410 |
| 1,977,159 | 10/1934 | Tursi | 297—112 |
| 2,737,229 | 3/1956 | Semar | 297—216 |
| 2,778,896 | 1/1957 | Tollefsen | 280—150 |
| 2,796,919 | 6/1957 | Ginsberg | 297—283 |
| 2,855,216 | 10/1958 | Sacks | 280—150 |
| 2,943,866 | 7/1960 | Witter | 297—216 |
| 2,985,229 | 5/1961 | Shamblin | 297—410 |
| 3,088,539 | 5/1963 | Mathues et al. | 280—150 |

FRANCIS K. ZUGEL, *Primary Examiner.*